(12) United States Patent
Wu

(10) Patent No.: US 10,637,643 B2
(45) Date of Patent: Apr. 28, 2020

(54) METHODS AND APPARATUSES OF DIGITAL DATA PROCESSING

(71) Applicant: Shengyuan Wu, Shandong (CN)

(72) Inventor: Shengyuan Wu, Shandong (CN)

( * ) Notice: Subject to any disclaimer, the term of this patent is extended or adjusted under 35 U.S.C. 154(b) by 64 days.

(21) Appl. No.: 15/028,944

(22) PCT Filed: Nov. 25, 2013

(86) PCT No.: PCT/IB2013/060369
§ 371 (c)(1),
(2) Date: Jun. 24, 2016

(87) PCT Pub. No.: WO2015/067996
PCT Pub. Date: May 14, 2015

(65) Prior Publication Data
US 2016/0301524 A1  Oct. 13, 2016

(30) Foreign Application Priority Data

Nov. 7, 2013 (CN) .......................... 2013 1 0547366

(51) Int. Cl.
*H04L 29/06* (2006.01)
*H04L 9/06* (2006.01)
*G09C 1/00* (2006.01)

(52) U.S. Cl.
CPC . *H04L 9/06* (2013.01); *G09C 1/00* (2013.01)

(58) Field of Classification Search
CPC ........... H04L 9/00; H04L 47/34; G11C 29/34; G11C 7/1027
See application file for complete search history.

(56) References Cited

U.S. PATENT DOCUMENTS

| 4,301,535 | A | * | 11/1981 | McKenny | G11C 16/34 324/211 |
| 4,965,883 | A | * | 10/1990 | Kirby | H03M 5/145 714/49 |
| 5,436,910 | A | * | 7/1995 | Takeshima | G11C 29/34 714/718 |
| 6,466,836 | B1 | * | 10/2002 | Astarabadi | G06Q 10/087 700/115 |
| 7,400,768 | B1 | * | 7/2008 | Mayzlin | G06K 9/03 382/177 |

(Continued)

FOREIGN PATENT DOCUMENTS

CN   103329445 A  *  9/2013

*Primary Examiner* — Sher A Khan

(57) ABSTRACT

The invention Ubit can make data semantics understandable to both humans and machine; semantic translating tools no needed any more, such as compiler, interpreter, semantic analysis, web parser, domain name resolution; machine embodies real intelligence.
The three password authentication makes entity authentication nearly unbreakable. Three key encryption can easily realize one-time pad, and also can used in data storage encryption; making data in perfect secure.
Ubit presents an interface method between human and human, between machine and human, and between machine and machine; makes all data compatible one another; and anyone can access anything, from anywhere, and in anytime. The methods make hardware and software much more precisely, efficiency and space saved.
All methods can be easily implemented.

1 Claim, 9 Drawing Sheets

(56) References Cited

U.S. PATENT DOCUMENTS

| | | | | |
|---|---|---|---|---|
| 9,432,298 B1* | 8/2016 | Smith | ............... | H04L 49/9057 |
| 2004/0098509 A1* | 5/2004 | Alfano | ................ | H04L 47/34 |
| | | | | 709/249 |
| 2004/0153913 A1* | 8/2004 | Fishman | ............. | H04L 1/243 |
| | | | | 714/724 |
| 2005/0022065 A1* | 1/2005 | Dixon | ................ | G06F 11/106 |
| | | | | 714/42 |
| 2007/0210916 A1* | 9/2007 | Ogushi | ............ | G06Q 10/0875 |
| | | | | 340/531 |
| 2008/0232318 A1* | 9/2008 | Aghili | ............. | H04W 74/002 |
| | | | | 370/329 |
| 2009/0184860 A1* | 7/2009 | Chan | ....................... | H04L 1/20 |
| | | | | 342/21 |
| 2009/0228329 A1* | 9/2009 | Asanuma | ........ | G06Q 10/06311 |
| | | | | 705/7.13 |
| 2010/0023824 A1* | 1/2010 | Buckley, Jr. | ... | G01R 31/318392 |
| | | | | 714/738 |
| 2012/0251106 A1* | 10/2012 | Valiveti | ............. | H04L 47/125 |
| | | | | 398/45 |
| 2012/0284533 A1* | 11/2012 | Assche | .................. | H04L 9/06 |
| | | | | 713/192 |
| 2014/0006884 A1* | 1/2014 | Haneda | ............... | G06F 11/006 |
| | | | | 714/701 |
| 2017/0169736 A1* | 6/2017 | Zhao | ..................... | G09C 1/00 |

* cited by examiner

| Ubit code | displaying symbols |
|---|---|
| code of "=" | "=" |
| ⋮ | ⋮ |
| code of "<=" | "<=" |
| ⋮ | ⋮ |
| code of "IF" | "IF" |
| ⋮ | ⋮ |
Figure 11
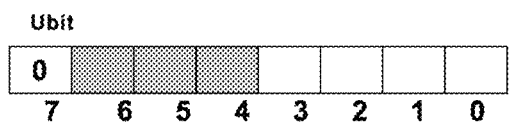
(a)
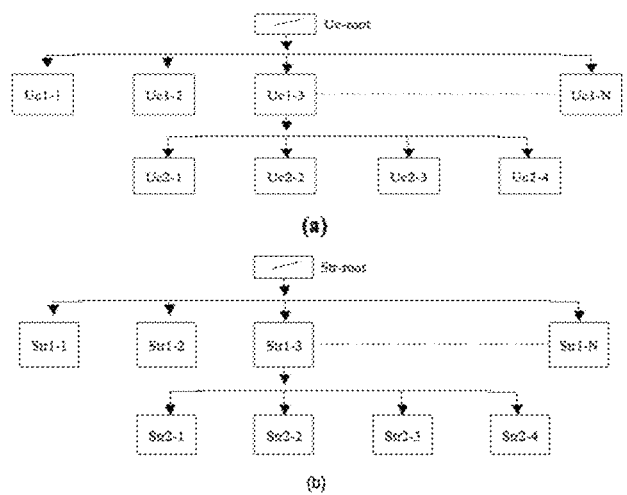
Figure 12
Figure 13

| Byte | 1xxxxxxx | 1xxxxxxx | 1xxxxxxx | 1xxxxxxx | 0xxxxxxx |
|------|----------|----------|----------|----------|----------|
| No.  | 1        | 2        | 3        | 4        | 5        |
(a)
| Byte | 1xxxxxxx | 1xxxxxxx | 1xxxxxxx | 1xxxxxxx | 1xxxxxxx | 1xxxxxxx | 0xxxxxxx |
|------|----------|----------|----------|----------|----------|----------|----------|
| No.  | 1        | 2        | 3        | 4        | 5        | 6        | 7        |
(b)
Figure 14
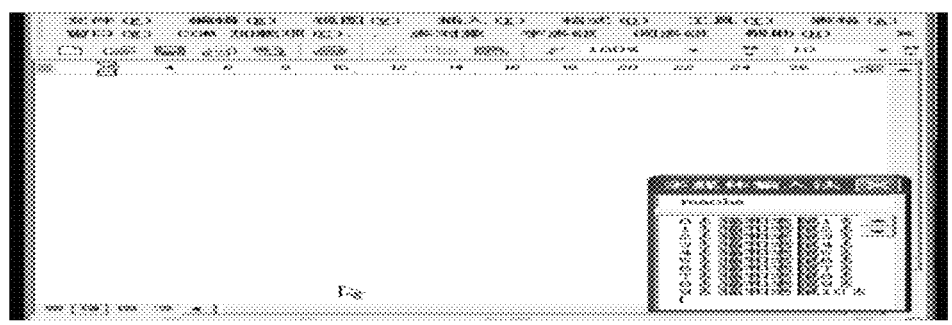
Figure 15
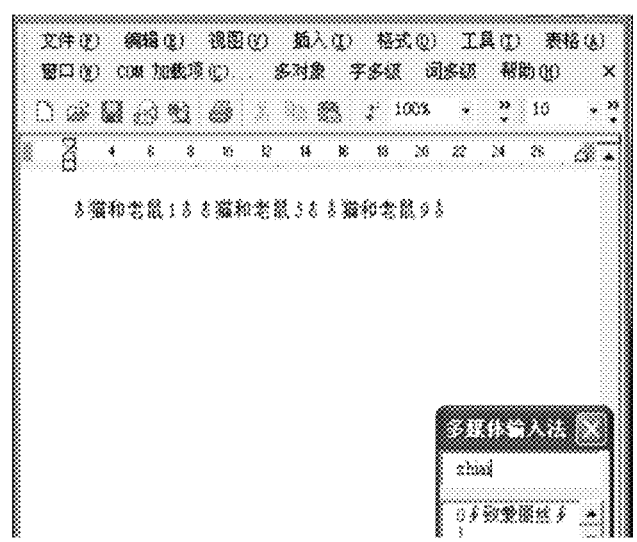
Figure 16

(a)

(b)

(a)

(b)

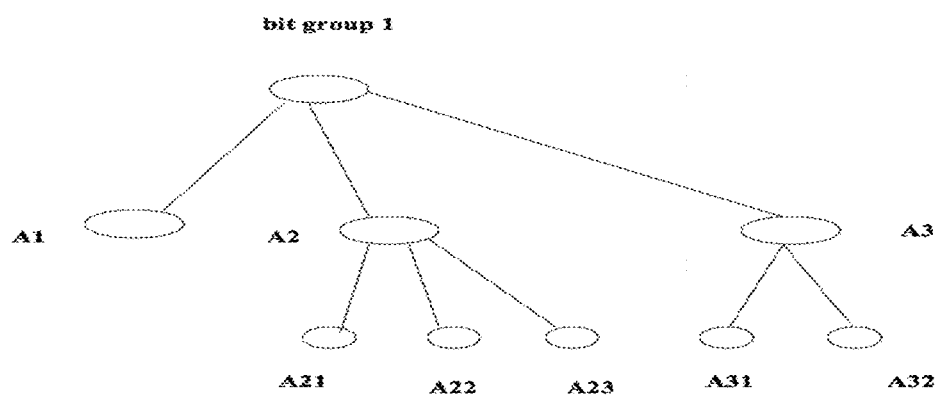
Figure 23
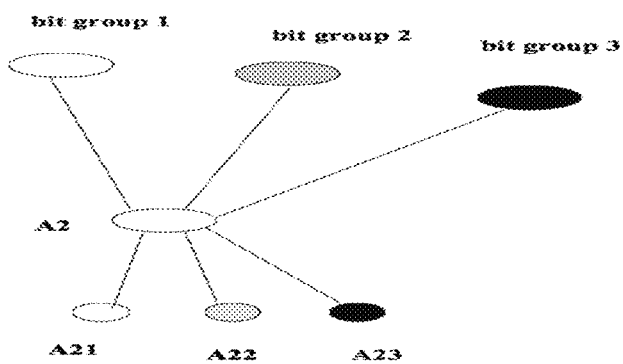
Figure 24
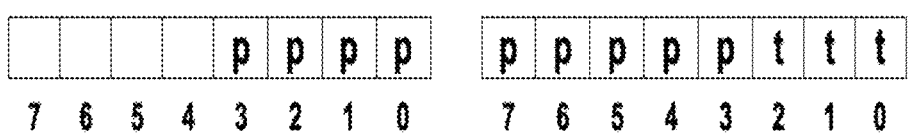
Figure 25
| GB2312 (16-87 section) | New codes (88-94 section) |
(a)
| Pinyin Tone Code (16-87 section) | Pinyin Tone Code (88-94 section) |
(b)
Figure 26

| Out-group | $O_1$ | $O_2$ | $O_3$ | ... | $O_n$ |
|---|---|---|---|---|---|
| In-group | $I_1$ | $I_2$ | $I_3$ | ... | $I_n$ |

(a)

| In-group | $I_1$ | $I_2$ | $I_3$ | ... | $I_n$ |
|---|---|---|---|---|---|
| In-group display | $D_1$ | $D_2$ | $D_3$ | ... | $D_n$ |

(b)

| Out-group | $O_1$ | $O_2$ | $O_3$ | ... | $O_n$ |
|---|---|---|---|---|---|
| Out-group display | $D_1$ | $D_2$ | $D_3$ | ... | $D_n$ |

| Out-group | 0 | 1 | 2 | 3 | 4 | 5 | 6 | 7 | 8 | 9 |
|---|---|---|---|---|---|---|---|---|---|---|
| In-group$_1$ | $I_0$ | $I_1$ | $I_2$ | $I_3$ | $I_4$ | $I_5$ | $I_6$ | $I_8$ | $I_3$ | $I_9$ |
| In-group$_2$ | $I_0$ | $I_5$ | $I_6$ | $I_7$ | $I_8$ | $I_1$ | $I_2$ | $I_3$ | $I_4$ | $I_9$ |

Figure 28

METHODS AND APPARATUSES OF DIGITAL DATA PROCESSING

TECHNICAL FIELD

Binary 1 and 0 digital data processing methods and apparatus.

BACKGROUND

Digital data representation and processing has been facing a big amount of very difficult problems; among them, three are most important and basic: How to make data security? How to make data understandable to computer and human? How to make data universal, no conflict, no matter what, no matter where, no mater when?

Data security risk has shocked everyone, every business, and every nation over the world; cyber, big data, cloud and mobile devices, are all in risk; according to a report, U.S. cloud industry stands to lose $35 billion because security risk; an assassin might kill his victim by disabling an implanted pacemaker or defibrillator from 30 feet away. It would be possible to write a "worm" for a particular brand of pacemaker or defibrillator, then spread it to other devices within range, from one person to another. Data virus might become human's virus.

Machine doesn't understand source program, which must be translated to machine for execution. Machine doesn't know what data it displayed, even doesn't know what is data, what is program; just obeyed to executing step by step. Therefore, Computer scientists dream that: humans can communicate with machine in terms of abstract concepts which can be easily understood for both humans and machine, the source program is not forced translated to machine language; and machine could perform algorithm discovery process rather than just obeyed execution.

Conflicts exist everywhere, from time to time. Different software, documents, code sets, different languages, different versions, different standards, different hardware, different time period, conflict one another. We had to solve these conflicts one by one; however, one conflict problem seems solved, new conflict problems appear.

Why the protected data is attached so easily? Why Computer scientists' dream can't be realized? Why conflicts exist everywhere and hardly solved? All these are because Bit.

The bit, binary 1 or 0, has been only acted as value, basic unit of capacity, since the first digital computer was born. Bit has never been used as structure before, and all problem solutions only depend on Bit value, not structure.

If a bit is only acted as value, only represents the capacity of data, the value of data, then bit is called as Vbit.

This invention makes bit can also acted as basic structure unit, to group, classify, organize and distinguish data, to make data structured and distinguishable; in this case, bit is called as Ubit. Bit can be divided into two class: Vbit and Ubit.

To make important or private data safe, unbreakable, this invention puts data into complicated Ubit structures. Encryption combines two parts: structure encryption and value encryption.

Ubit presents various cipher algorithms, integrating hiding, substituting, and transposing technique as a whole; the data is hidden in Ubit structures. It's impossible to know what is Vbit, what is Ubit without cipher key. Algorithm is multitudinous, unpredictable and fully dependent on key; further, the key structure is complicated, invisible, in big variable length; key is divided into in-key and out-key; key exchange is safe and unbreakable; algorithm analysis and brute force attacks is useless.

Out-password and in-password mechanism makes password unbreakable by any cracking methods used now.

Dictionary Attack, Brute Force Attack and offline cracking are useless because in-password is too long and too complicated, not only plain text.

Key logger or screen scraper, video recording, shoulder surfing, phishing and social engineering can only steal static out-password, no way for in-password and dynamic out-password.

Ubit makes data semantic, understandable to both humans and machine; no compiler needed to run a source program. Machine can perform algorithm discovery process rather than just obeyed execution, and embodies real intelligence. Computer scientists' dream has been realized.

Ubit make all data consistent one another, no matter old or new, no matter what kinds, what code sets, what code length, no matter what platform, machine, networks, languages, documents and media.

Ubit makes hardware and software cheaper, much more efficiency and space saved.

All methods of this invention can be easily implemented.

The humans in this article can refer to any living creature, or living thing, which can communicate by a language. The machine here refers to any apparatus or equipment implemented with binary 1 and 0 sequence.

DETAIL DESCRIPTION

1. A binary 1 and 0 digital data processing method, the processing comprising at least one of the following steps:

1) Scan a binary 1 and 0 sequence from left to right, distinguishing the sequence into group step by Right 0 rule as the following:

Scanning a binary 1 and 0 sequence from left to right, if the first bit is 1, continue scanning until a bit 0 is met, then from the first bit 1 to bit 0 is distinguished as a group; if the first bit is 0, then the bit 0 is distinguished as a group; continue scanning and distinguishing until the end of the sequence, if the last bit of the sequence is not 0, then the last group is an incomplete group;

The group above is characterized as:

The left bit neighbor of a group can't be 1, but the right bit neighbor of a group can be 1 or 0, there is one and only one bit 0 in one group, if there are more than 1 bit in a group, then the bit 0 must be the rightmost bit in the group; Refer to FIG. 1 (a).

2) Scan a binary 1 and 0 sequence from right to left, distinguishing the sequence into group step by Right 0 rule as the following:

Scanning a binary 1 and 0 sequence from right to left, if the first bit is 1, continue scanning until a bit 0 is met, then from the first 1 to the right neighbor bit of the bit 0 is distinguished as an incomplete group; if the first bit is 0, continue scanning until second bit 0 is met, then from the first 0 to the right neighbor bit of the second bit 0 is distinguished as a group; continue scanning and distinguishing until the end of the sequence, The group above is characterized as:

The left bit neighbor of a group can't be 1, but the right bit neighbor of a group can be 1 or 0, there is one and only one bit 0 in one group, if there are more than 1 bit in a group, then the bit 0 must be the rightmost bit in the group; Refer to FIG. 1 (a).

3) Scan a bit 1 and 0 sequence from right to left, distinguishing the sequence into group step by Left 0 rule as the following:

Scanning a bit 1 and 0 sequence from right to left, if the first bit is 1, continue scanning until a bit 0 is met, then from the first 1 to the bit 0 is distinguished as a group; if the first bit is 0, the bit 0 is distinguished as a group; continue scanning and distinguishing until the end of the sequence, if the last bit of the sequence is not 0, then the last group is an incomplete group;

The group above is characterized as:

The right bit neighbor of a group can't be 1, but the left bit neighbor of a group can be 1 or 0, there is one and only one bit 0 in one group, if there are more than 1 bit in a group, then the bit 0 must be the leftmost bit in the group; Refer to FIG. 2 (a).

4) Scan a binary 1 and 0 sequence from left to right, distinguishing the sequence into group step by Left 0 rule as the following:

Scanning a binary 1 and 0 sequence from left to right, if the first bit is 1, continue scanning until a bit 0 is met, then from the first 1 to the left neighbor bit of the bit 0 is distinguished as an incomplete group; if the first bit is 0, continue scanning until next bit 0 is met, then from the first 0 to the left neighbor of the next bit 0 is distinguished as a group; continue scanning and distinguishing until the end of the sequence, The group above is characterized as:

The right bit neighbor of a group can't be 1, but the left bit neighbor of a group can be 1 or 0, there is one and only one bit 0 in one group, if there are more than 1 bit in a group, then the bit 0 must be the leftmost bit in the group;

Refer to FIG. 2 (a).

5) Scan a binary 1 and 0 sequence from left to right, distinguishing the sequence into group step by Right 1 rule as the following:

Scanning a binary 1 and 0 sequence from left to right, if the first bit is 0, continue scanning until a bit 1 is met, then from the first bit 0 to bit 1 is distinguished as a group; if the first bit is 1, then the bit 1 is distinguished as a group; continue scanning and distinguishing until the end of the sequence, if the last bit of the sequence is not 1, then the last group is an incomplete group;

The group above is characterized as:

The left bit neighbor of a group can't be 0, but the right bit neighbor of a group can be 1 or 0, there is one and only one bit 1 in one group, if there are more than 1 bit in a group, then the bit 1 must be the rightmost bit in the group;

Refer to FIG. 3 (a).

6) Scan a binary 1 and 0 sequence from right to left, distinguishing the sequence into group step by Right 1 rule as the following:

Scanning a binary 1 and 0 sequence from right to left, if the first bit is 0, continue scanning until a bit 1 is met, then from the first 0 to the right neighbor bit of the bit 1 is distinguished as an incomplete group; if the first bit is 1, continue scanning until next bit 1 is met, then from the first 1 to the right neighbor bit of the next bit 1 is distinguished as a group; continue scanning and distinguishing until the end of the sequence, The group above is characterized as:

The left bit neighbor of a group can't be 0, but the right bit neighbor of a group can be 1 or 0, there is one and only one bit 1 in one group, if there are more than 1 bit in a group, then the bit 1 must be the rightmost bit in the group;

Refer to FIG. 3 (a).

7) Scan a binary 1 and 0 sequence from right to left, distinguishing the sequence into group step by Left 1 rule as the following:

Scanning a binary 1 and 0 sequence from right to left, if the first bit is 0, continue scanning until a bit 1 is met, then from the first 0 to the bit 1 is distinguished as a group; if the first bit is 1, the bit 1 is distinguished as a group; continue scanning and distinguishing until the end of the sequence, if the last bit is not 1, then the last group is an incomplete group;

The group above is characterized as:

The right bit neighbor of a group can't be 0, but the left bit neighbor of a group can be 1 or 0, there is one and only one bit 1 in one group, if there are more than 1 bit in a group, then the bit 1 must be the leftmost bit in the group;

Refer to FIG. 4 (a).

8) Scan a binary 1 and 0 sequence from left to right, distinguishing the sequence into group step by Left 1 rule as the following:

Scanning a binary 1 and 0 sequence from left to right, if the first bit is 0, continue scanning until a bit 1 is met, then from the first 0 to the left neighbor bit of the bit 1 is distinguished as an incomplete group; if the first bit is 1, continue scanning until a bit 1 is met, then from the first 1 to the left neighbor of the last bit 1 is distinguished as a group; continue scanning and distinguishing until the end of the sequence, The group above is characterized as:

The right bit neighbor of a group can't be 0, but the left bit neighbor of a group can be 1 or 0, there is one and only one bit 1 in one group, if there are more than 1 bit in a group, then the bit 1 must be the leftmost bit in the group;

Refer to FIG. 4 (a).

9) Scan a binary 1 and 0 sequence from left to right, distinguishing the sequence into groups by Right 0 and Right 1 mixed rule as the following:

Scanning a binary 1 and 0 sequence from left to right, if the first bit is 1, continue scanning until a bit 0 is met, then from the first bit 1 to bit 0 is distinguished as a group; if the first bit is 0, continue scanning until a bit 1 is met, then from the first bit 0 to bit 1 is distinguished as a group; continue scanning and distinguishing until the end of the sequence;

The group above is characterized as:

There is one and only one bit 0 or one bit 1 in one group, and the bit number of one group must be greater than 1;

Refer to FIG. 5 (a).

10) Scan a bit 1 and 0 sequence from right to left, distinguishing the sequence into groups by Left 0 and left 1 mixed rule as the following:

Scanning a bit 1 and 0 sequence from right to left, if the first bit is 1, continue scanning until a bit 0 is met, then from the first 1 to the bit 0 is distinguished as a group; if the first bit is 0, continue scanning until a bit 1 is met, then from the first 0 to the bit 1 is distinguished as a group; continue scanning and distinguishing until the end of the sequence;

The group above is characterized as:

There is one and only one bit 0 or one bit 1 in one group, and the bit number of one group must be greater than 1.

Refer to FIG. 6 (a).

A complete group distinguished by the steps above is called as an Uframe; each bit in an Uframe, is acted as basic structure unit, called as Ubit; to make data structured and understandable, and to make data more safe. Uframe is a basic structured data component. Uframe type includes Right 0 Uframe, related to step 1) and 2); Left 0 Uframe, related to step 3) and 4); Left 1 Uframe, related to step 7) and 8); Right 0 and Right 1 mixed Uframe, related to step 9); Left 0 and left 1 mixed Uframe, related to step 10).

As a structure unit, Ubit is not act as value.

If a bit acts as value, not act as structure unit, the bit is called as Vbit.

If a bit acts as mark, but not act as structure unit, not in an Uframe; the bit is also Vbit.

A bit can act as Ubit, or Vbit.

Ubit can act as Vbit, and Vbit can also acted as Ubit.

2. The method as defined above as used in distinguishing a binary 1 and 0 sequence into groups; further comprising at least one of the following characteristics:

1) Distinguish a binary 1 and 0 sequence into groups based on a defined Uframe sequence outside the sequence, and the relation of the binary 1 and 0 sequence and the Uframe sequence also defined;

In FIG. 1(b), FIG. 2(b), FIG. 3(b), FIG. 4(b), FIG. 5(b), and FIG. 6 (b), the 12 byte sequence is grouped into groups by Uframe sequence outside the sequence Each Ubit in the Uframe sequence relates to 1 byte in the byte sequence.

Another example, Chinese character sequence is distinguished as words by Uframes outside the character sequence in FIG. 7.

Here, each Ubit relates to 1 character in the character sequence.

2) Distinguish a binary 1 and 0 segment sequence into groups based on a defined Uframe sequence inside the binary 1 and 0 sequence;

A segment contains bits, and at least 2 bits. For example, the 12 byte sequence is grouped into groups by Uframe in FIG. 1(c), FIG. 2(c), FIG. 3(c), FIG. 4(c), FIG. 5(c), and FIG. 6 (c); the Uframe are inside the byte sequence, each group is called as Ubit group. Here, each byte is a segment.

Select one bit in each segment in a segment sequence, set each selected bit according to an Uframe sequence, then the segment sequence is grouped into groups, each group is called as Ubit group.

Ubit group can be also described as following: an Uframe sequence inside a 1 and 0 segment sequence distinguishes the 1 and 0 segment sequence into groups, each group is called as Ubit group.

Uframe can be constructed based on the methods described in method 1; the length of Uframe can be defined as necessary.

Ubit group is also called as Ucode, or Ucode. However, the concept of group is more generalized than code; called as Ucode, or Ucode is just for convenience, the meaning is equal to Ubit group.

An Ucode can be very small, but at least 2 bits, it can extend to very long, no limited.

An Ucode contains one segment or multiple segments, each segment consists of Ubit and Vbit, Ubit is acted as basic structure unit, used to group, to organize, and to structure data; Vbit is acted as value, to code object.

As bit acts as value, the bit is called as Vbit; sometimes, bit can be acted as mark, but not in an Uframe, this kind of bit is still Vbit, not Ubit.

The length of segment in an Ucode can be equal or not equal.

In a 1 and 0 sequence, bit group are not distinguished by Uframes, is called as Vbit group, or Vbit code, or Vcode.

All character codes used now are Vcodes.

A group of bits is called as bit group, such as: Uframe, Ubit group, Vbit group.

Nearly all bits in a Vbit group are acted as value, they are Vbit; some bit in a Vbit group may be acted as mark, but they are not in Uframe, therefore, this kind of bit is still Vbit, not Ubit. Therefore, Vbit group only consists of Vbit.

In FIG. 1(c), FIG. 2(c), FIG. 3(c) FIG. 4(c), FIG. 5(c), and FIG. 6 (c), the Ubit is at the leftmost bit of each byte; however, it can be at any position of a segment.

In a 1 and 0 sequence, Ucodes are distinguished by one grouping rule as described in 1, but Vbit groups are not. For example, if ASCII codes in a 1 and 0 sequence are distinguished by one grouping rule as described in 1, then they are Ucodes; if ASCII codes are distinguished by the code length, they are not Ucodes. As another example, in a code sequence, ASCII codes mixed with GB 2312 codes, the codes are distinguished by the leftmost bit of each byte, 0 or 1; they are not Ucodes either; in this case if one grouping rule is used, then error would happened, one Chinese character code and an ASCII code might be distinguished as a group.

Ucode has a lot of advantages over Vcode.

For example, In FIG. 1(c), there are 5 Ucodes, the length of them is 2, 3, 1, 1, 5 byte respectively; that is any different length of Ucodes can be mixed in a sequence, however, any different length of Vcodes can't be mixed in a sequence.

Variable-length Ucodes, different kinds of Ucodes can be mixed in one singular sequence; one object can be coded by one Ucode. For example, each object in FIG. 8 (b) is corresponding to 1 Ucode in (a) respectively, the underlined objects are audio, video, image, 2 character Chinese word; 1 character Chinese word, 3 character Chinese word, and 1 English letter, respectively. Each audio, video or image object is 3 byte Ucode; and the type of object can be distinguished by the first byte of the Ucode, which is called as class byte. For example, the first underlined Ucode {F2 A0 2D} is an audio object, the second underlined Ucode {F3 A0 6A} is a video object; the third underlined Ucode {F1 A2 7C} is an image object;

F1, F2, F3, is related to audio, image, video object respectively. That's to say: object's attribution is embedded in Ucode.

3) Distinguish a binary 1 and 0 sequence into groups by Ucodes outside the sequence;

The following expression is an Ucode sequence:

$$yCoordinate = intercept + Slope * xCoordinate$$

The expression includes 4 variables and 3 operators; they are represented in 7Ucodes.

The value of the variables is stored in another sequence, a consecutive storage apace; each variable's address in the storage space is embedded in it's Ucode; therefore, the storage space is distinguished into groups by the addressed in Ucodes, i.e. by Ucodes.

Another example is illustrated in FIG. 8, (a) is an Ucode sequence, (b) is a character sequence, which is grouped by the Ucode sequence in (a); the Ucode and the character group is related one to one.

4) Distinguish a binary 1 and 0 sequence into groups by Ucodes inside the sequence;

As illustrated in FIG. 9, a binary 1 and 0 sequence is divided into N segments (Seg) by N Ucodes (Uc), each segment's attribution is embedded in it's related Ucode, such as data type, the length of each segment.

5) Change Uframe type by bitwise operation;

For example:

Bitwise NOT operation on Right 0 Uframe changes to Right 1 Uframe.

Left circular operation on Right 0 Uframe changes to Left 0 Uframe, but the Uframe is reorganized.

6) Information embedded in or associated with Ucode.

Here, information refers to any kind of data, such as object attribution, object semanteme, relation among objects, rule, knowledge, language, and so on.

In the following parts of this description, the meaning of attribution is not limited, it also refers to information.

Embedded means putting information inside an Ucode, the value part of the Ucode. Because the length of Ucode is no limited, it can hold enough information.

Usually one Ucode relates to one Uframe (except nested Ucode); therefore, embedded in Ucode can also say embedded in Uframe.

How to make data understandable to machine and humans? This is a fundamental problem.

For example:

If "123" is described in notation form, only understandable to humans; to make it understandable to machine, it must be translated to machine language.

If "123" is described in machine language, only understandable to machine; to make it understandable to humans, it must be translated to humans' language.

Not just "123", nearly everything is in similar scenario.

However, if "123" represented in Ucode, and embedded in or associate to machine language and human's language, then data can be understandable by humans and machine.

Humans write source program in notation form, which must be translated to machine. However, Ucode can make it different.

Assume there are three kinds of primitives in a programming language: keyword, operator, and identifier. Assume each keyword, operator, or identifier is represented by one 3-byte Ucode, and with attribution embedded inside as illustrated in FIG. 10. The attribution embedded in Ucodes is understandable to machine.

FIG. 11 Illustrates how Ucode related to humans' language, the 1$^{st}$ column is Ucodes of operator and keywords; the 2$^{nd}$ column is the displaying symbols related to each Ucode. Identifier can be done by the same way. This makes the program understandable to humans. FIG. 8 illustrates another example, (a) Attribution embedded in Ucode understandable to machine, and (b) Symbols related to Ucode understandable to humans.

It's possible to make machine execute source program, Ucode sequence, directly, or to make machine execute Ucode sequence by extracting the machine language from the Ucodes. Next, illustrate how to extract the machine language from the following expression represent in Ucode.

*y*Coordinate=intercept+Slope**x*Coordinate

Each primitive in the expression is related to one Ucode; as program inputting, type and address of a variable are filled in related Ucode.

There are three operators, =, *, +; the value of their related Ucodes is coded according to the privilege of the operators. So, the operating rules have been embedded in Ucodes.

Humans can understand the expression by symbols; machine can understand the expression by the attribution embedded in Ucodes.

Because the information, collected by a compiler in lexical, syntax and semantic analysis; has been embedded in Ucodes; the machine language can be extracted from the source program directly, compiler no needed.

The machine knows the data type, the addresses of the variables; the privilege of operators, the operating rules; therefore, the machine knows what operation sequence, what instructions should use, where to access; i.e. how to execute the expression. Next illustrate how extract the machine language from the expression.

Compare the Ucodes of "=, *, +" the highest privilege is: *; so, calculate * first; buffer=Slope*xCoordinate; Then

*y*Coordinate=intercept+buffer.

These two expressions above is called as three address code in compiler, and easy to be mapped to assembly language; the later is mapped as the following:

mov ax, intercept;
add ax, buffer;
mov yCoordinate, ax;

For simplicity, here buffer, intercept, and yCoordinate only refer to memory address extracted from Ucodes. Suppose the machine's assembly language is represented in Ucodes also; the machine instruction codes have been embedded in Ucodes. Extracting machine instruction codes, addresses from the Ucodes, then machine code of the expression is extracted.

This makes software cross platforms, cross machines, cross networks, cross languages.

In above example, the humans' language is related to Ucodes; Ucode can also code humans' language, for example, 3 byte Ucode can code 2 byte characters, the first byte for what kind of language, or what kind of code set, such as GB2312, JISX 0208 and KSC 5601.

Ucode can code, embed, or associates various languages; humans' language: such as natural language, algorithms, markup language, programming language, mathematical language; machine languages; animal's languages.

3. The method as defined in 2 wherein further comprising at least one of the following characteristics:

1) Represent and process language understandable to humans and machine by attribution embedded in or relate to Ucode;

2) Machine execute a language by extracting the attributions from the Ucode sequence;

3) Machine execute a language by executing the Ucode sequence directly;

4) Represent and process programming language by primitives' attribution embedded in or related to Ucodes;

5) Machine execute source program in Ucode sequence directly;

6) Machine executing Ucode sequence directly;

CPU can understand Ucodes by microprogramming, this can make parallelism easier.

Operating system understands Ucodes that can make operating system level parallelism easier.

Animal' language represented by Ucodes, should be animal understandable and machine understandable;

7) Machine executing Ucode sequence by extracting the attributions from the Ucode sequence;

8) Store language word segmentation information in Uframe sequence;

Refer to FIG. 7.

9) Make language syntax, semanteme or phone information embedded in or relate to Ucode;

Refer to FIG. 8.

10) Comprehend a language by extracting attribution embedded in or relate to Ucode;

Refer to FIGS. 8, 10 and 11.

11) Represent and process data or data structure by data or data structure attribution embedded in or relate to Ucode;

Hear the data can be any type, such as integer, float, pointer and array.

FIG. 10 illustrate Ucode format for data type.

FIG. 12 is Illustration of array storage at the memory addresses.

Assume the array is "A", from the Ucode of "A", as shown in FIG. 8, find the memory address of "A"; from the first Ucode in the memory address of "A", which is filled in the Ucode as program inputting; extract the dimension: 2, and the data type: 4 byte integer; from the second Ucode, extract the row number: 2; from the third Ucode, extract the column number: 3.

Data structure can be any type, linear or nonlinear structure, such as list, linked list, tree structure.

For example, represent each node of a tree or a linked list by one or multiple Ucode, and embed the node attribution inside.

FIG. 13. Illustrating tree structure representing
(a) Ucode for machine
(b) Ucode related character string for humans.

Assume the tree structure of FIG. 13 is a file system, the Ucode in each node embedded in or related to attributions of the file, including the address in storage space, by which the machine can access the file.

The String in FIG. 13 (b) is related to the Ucode in (a), humans can understand the file structure by the string. Here the string is in file directory form, other form can be used, for example, FIG. 8 (b) displayed in object name and type.

12) Machine executing mathematical operation by the operations of Ucodes;

Overflow refers to that a calculation or operation yields a result that is too large for the computer register to handle.

If number is represented in Ucode, because the length of Ucode is not limited, the value of the number is not limited; because the number consists of segments in an Ucode, the calculation can be divided into steps, each step, just fetch some segments into registers.

Overflow problem can be easily solved by Ucode, so the truncation error problem.

Data operation can include two parts: value operation and structure operation. Data operation may change the type of data. Mathematics with data structure is called as structure mathematics; structure mathematics can improve value mathematics, which only deals value operations.

13) Represent and process object by one or multiple Ucodes with object's attribution embedded in or relate to Ucode;

14) Represent and process object structure, or object address or object ID by object's structure attribution, or object's address, or object's ID embedded in or related to Ucode;

Address can be global or local; global address, such as URL; local address, such as file directory, address in a file, address in memory.

For example, IP address can be represented in variable length Ucode; FIG. 14 Illustrates IP address represented in Ucode, (a) IPv 4 in 5 byte Ucode form; (b) IP in 7 byte Ucode form; the shaded 3 bits can be used to represent protocol. 5 byte Ucode form can represented all IPv 4 address; extending to 7 bytes or more as needed.

Ucode form can associate to notation for humans.

URL of a file consists of 2 Ucodes, IP address and File address.

An Ucode can also represent an object address in a file; then globally access the object needs 3 Ucodes.

The file directory of each audio, video or image object in FIG. 8 (a) is related to one Ucode, and the file attribution has been embedded in.

15) Represent and process executable instruction by instruction's attribution embedded in or relate to Ucode;

Executable operations, such as CPU instruction or system call, or called function;

16) In a binary 1 and 0 sequence, object attribution is tagged by Ucode, or embedded in Ucode, or related by Ucode;

Tags in the existed documents or medias are characters, or symbols.

However, they can be Ucodes. For example, each tag in web can be one Ucode.

FIG. 9 shows an object sequence tagged by Ucodes with the object attributions embedded in.

Assume Seg2 is a character segment coded in UCS-2, and Seg3 is a character segment coded in UCS-4, Seg4 is machine executable code segment; Uc2 embedded in UCS-2 attribution and the segment length, Uc3 embedded in UCS-4 attribution and the segment length, Uc4 embedded in machine executing code attribution and the segment length. The three objects are different, and in different encoding, but they can be distinguished by Ucodes. The object sequence can hold any kind of objects, consistent one another without conflict.

Data consistent include space consistent and time consistent. Space consistent refers to different region, different areas, different platform, different code sets, and so on; and time consistent refers to any time, old or new.

17) Make different objects or different encoding to be consistent one another in one object sequence by Ucode tagging object's or encoding's attribution;

18) Represent and process database by element or element's attributions embedded in or related to Ucode;

19) Web page's element or element attribution tagged by Ucodes with element's attribution embedded in or relate to Ucodes;

20) Represent and process document by element or element's attribution tagged by Ucode, or embedded in or relate to Ucode;

21) Various object mixed inputting, processing and interacting among humans and humans, interacting among humans and machine, interacting among machine and machine by object attributions embedded in or related to Ucode; and language embedded in or related to Ucode;

Various kinds of objects, or variable length Ucodes, can be mixed inputted and processed as illustrated in FIG. 15-19. (The operation for Chinese word is by Chinese Pinyin)

It's possible that inputting and processing is understandable by humans or machine; from any machine, any person, anywhere, any platform, any networks, and in any language. Inputting method is unlimited, such as: by hand, by speech, by eye, by feeling, and by gesture.

Software can be edited as document, and easily be protected, programming and software debugging is easier, the difference between algorithms and programs, the difference among different programming languages, the difference among platforms, the difference among different natural languages, the difference among different languages in various areas, become less.

22) Represent and process image or audio or video by attributions embedded in or related to Ucodes;

23) Divide image or audio or video into segments by segment's attributions embedded in or related to Ucodes;

24) In pattern recognition, representing and processing object feature by attributions embedded in or related to Ucodes;

25) In artificial intelligence processing, representing and processing by Ucodes;

For example: agent, percept sequence, action sequence, program, neuron, and so on.

26) In data compression, representing and processing data by attributions embedded in or related to Ucode;

For example, represent and process data redundancy by Ucodes.

27) Represent and process cartoon by element's attributions embedded in or related to Ucode;

28) Represent and process in computer control, or aided design or manufacture by attributions embedded in or related to Ucode;

29) Communication or network by transmitting Ucode sequence or Uframe sequence;

30) Communication and interactive among humans, communication and interactive among machines, communication and interactive among humans and machines by humans' language, or by machine's language, or by humans' language and machine's language embedded in, or related to Ubit groups;

The communication and interactive can be local or remote, can be used in bionic simulation, such as representing and processing neural network, machine intelligence, and so on.

31) Represent and process an object sequence by one or multiple binary 1 and 0 sequence; at least in one sequence Ucode or Uframe is used;

32) Represent and process static or dynamic structured object by attributions embedded in or related to Ucode;

33) Representing and processing object or object part by attributions embedded in or related to Ucode;

34) Machine execute operation by extracting attributions embedded in or related to Ucode;

35) Machine execute hardware operation among hardware by extracting attributions embedded in or related to Ucode;

Such as hardware ID, connection or disconnection, change parts, change structure.

36) Humans or machine comprehend message by extracting attributions embedded in or related to Ucode;

37) Make Robot semanticized and understandable to humans and machine or among robots by related attributions embedded in or related to Ucode;

38) Representing and processing cloud calculation or big data by attributions embedded in or related to Ucode;

39) Make multiple kernels or CPU or operating system parallelism by Ucode;

40) Representing and processing operating system file system by attributions embedded in or related to Ucode;

41) Make a binary 1 and 0 sequence or a random number as an Ubit Frame key or an Ucode key;

A key of an Ucode sequence is called as Ucode key.

A key of an Uframe sequence is called as Uframe key.

Each bit in an Uframe key acts as an Ubit; however, as used in operation, each bit in Uframe key also can act as a Vbit.

An Ucode key can be made depending on a binary 1 and 0 sequence or a random number, such as: the segment length of Ucode, the grouping rule, the Ubit position located in a segment, and so on.

42) Transpose Uframe related bits in one binary 1 and 0 sequence according to Uframe key; FIG. 20 is an example for transposition. The bits related to one Ubit of one Uframe is called bit segment. For example, in the second row of FIG. 20, 1 to 12 refers to bit segment. One bit segment contains one bit or multi-bits. Uframe and related bit segment is rearranged.

The transposition can be used in stream cipher or block cipher.

43) bits, characters, words, phrases, or other data substituted by Ucodes, or embedded in Ucodes, or associated with Ucodes;

44) Operating on a binary 1 and 0 sequence with Uframe key;

In operation, each Ubit in an Uframe sequence can act as Vbit, different frame can do same or different operation.

45) Hide Uframe key into or extract Uframe key from a binary 1 and 0 sequence; or hide a binary 1 and 0 sequence into or extract a binary 1 and 0 sequence from Uframe key mixed sequence;

This can be used in cipher or steganography; the inserted data can be extracted according to the Uframe key.

46) Code or embed data into, or decode or extract data from a binary 1 and 0 sequence according to an Uframe key;

Code data into bit segments; the coded data is hardly decoded without the Uframe key.

Transposing, coding, and embedding can be combined together.

47) Shifting Ucode key or Ubit frame key by Ucode or Ubit frame;

This is illustrated in FIG. 21. The shift length can be different each time.

48) Operating an Ucode key with a binary 1 and 0 sequence;

XOR operation is illustrated in FIG. 22. In operation, the Ubit in Ucode can act as Ubit or Vbit.

49) Operating times between Ucode key and binary 1 and 0 sequence depends on Ucode key;

50) Extracting Uframe sequence from binary 1 and 0 sequence used in data integrity or authentication;

As extracting, select segment and the length of a segment, select 1 bit in each segment as Ubit, extract Ubit from each segment, then form an Uframe sequence.

Extracting one or multiple Uframe sequence can be used in authentication or data integrity for one data or multiple data;

The counted Uframe number can also used in data integrity authentication.

51) Insert message embedded in Ucode chain into a binary 1 and 0 sequence;

For example, insert message into image for steganography.

52) Detect malicious message or expected message by matching Uframe pattern or Ucode pattern from binary 1 and 0 sequence;

Uframe pattern is a known Uframe sequence, and Ucode pattern is a known Uframe sequence.

53) Cipher data by changing or blocking object structure or object attributions or object relations embedded in or related to Ucodes;

54) Execute hardware operation by changing or blocking its structure or object attributions or object relations embedded in or related to Ucodes;

55) Apply Uframe or Ucode in digital signature.

4. The method as defined in 1, or 2, or 3, wherein the method or characteristic further comprising at least one of the following characteristics:

1) Applied in sequence plane, sequence space, dynamic sequence plane, or dynamic sequence space;

Sequence plane refers to a serial sequences arranged in a plane; sequence space refers to a serial sequence planes arranged in a space, dynamic refers to changes as time changes.

2) Applied in software, or hardware, or apparatus.

The methods can be applied in each binary 1 and 0 digital data processing area, no matter what kind form 1 and 0 is represented, such as electronic, quantum, biological form.

BRIEF DESCRIPTION OF DRAWINGS

Figures 4, 5, 6:
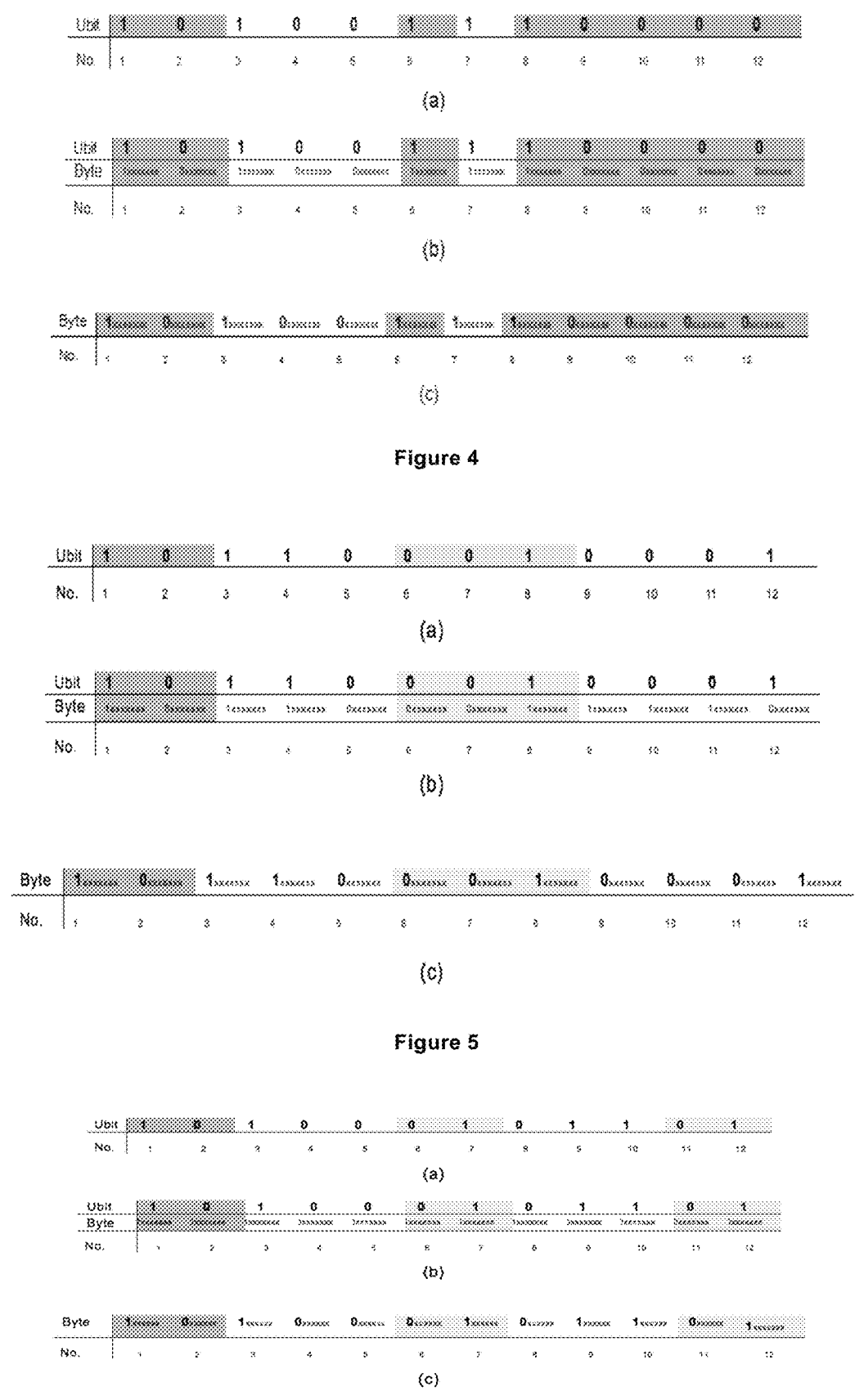

FIG. 4 Diagram of scanning a binary 1 and 0 sequence from right to left, distinguishing the sequence into group step by Left 1 rule; and diagram of scanning a binary 1 and 0 sequence from left to right, distinguishing the sequence into group step by Left 1 rule
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.

FIG. 5 Diagram of scanning a binary 1 and 0 sequence from left to right, distinguishing the sequence into groups by Right 0 and Right 1 mixed rule
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.

FIG. 6. Diagram of scanning a bit 1 and 0 sequence from right to left, distinguishing the sequence into groups by Left 0 and left 1 mixed rule
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.

FIG. 11 Diagram of associating humans' language with Ucode
  The 1st column is Ucodes of operator and keyword; the 2nd column is the displaying symbols of each Ucode.

FIG. 12. Diagram of array storage at the memory addresses
  The array with 2 rows, and 3 columns; data type is 4 byte integer, stored row by row.
  (a) The 1st, 2nd, 3rd byte, are three one byte Ucodes; The first Ucode is for dimension and data type, the second Ucode is for number of rows, the third is for number of columns. 4 to 15 bytes are used to store 1st row; and 16 to 27 byes are used to store 2nd row.
  (b) The first Ucode format, 3 bits {4-6} for dimension, 4 bits {0-3} for data type.

FIG. 13. Diagram of Ucode tree and related character string tree
  (a) Ucode tree for machine
  (b) Character string tree for humans, which relates to the Ucode in (a) one to one; Here the string is in file directory form, other form can be used, in FIG. 8 (*b*) displayed in object name and type.

FIG. 14 Diagram of IP address Ucode format
(a) IPv 4 in 5 byte Ucode form
(b) IP address in 7 byte Ucode form
The shaded 3 bits can be used to represent protocol.

FIG. 15. Diagram of video clip object inputting
Input video object: clips of "猫和老鼠" ("cat and mouse"; "maohe": the Chinese pinyin of "cat and mouse"). Three clips have been inputted: "猫和老鼠 1", "猫和老鼠 5", "猫和老鼠 9".

FIG. 16. Diagram of audio object inputting
Input an audio object: "致爱丽丝" ("Allis"; "zhiai" pinyin of Chinese "Allis").

FIG. 23 Diagram of Object attributions
There are 3 first level attributions for the object: A1, A2, A3, but only one bit group1 relate to the object. There are three second level attributions for the first level attribution A2: A21, A22, A23.

FIG. 24 Diagram of bit group and object attribution relation
There are 3 bit groups, bit group2 and bit group3 are newly added; each related to one second level attribution.

FIG. 25 Diagram of Chinese character Pinyin Tone Code
3 bits for Tones marked with t, 9 bits for Pinyin marked with p.

FIG. 26 Diagram of GB2312 codes and new polyphone character codes
(a) GB2312 character codes and new polyphone character codes;
(b) Pinyin Tone Code for GB2312 and New codes;
Character code and Pinyin Tone Code are related one by one.

FIG. 27 Diagram of the relation between two sequences
(a) Diagram of the relation between out-group sequence and in-group sequence;
(b) Diagram of the relation between in-group sequence and in-group displaying sequence;
(c) Diagram of the relation between out-group sequence and out-group displaying sequence;
O1, O2, O3... Om refers to out-group sequence; out-group refers to one or multiple out-group.
I1, I2, I3... Im refers to in-group sequence; in-group refers to one or multiple In-group.
In-group display: D1, D2, D3--- Dm, refers to In-group displayed bit group;
Out-group display: D1, D2, D3--- Dm: refers to out-group displayed bit group.

FIG. 28 Diagram of dynamic out-group
Out-group: 0, 1, 2, 3, 4, 5, 6, 7, 8, 9
In-group1: 10, 11, 12, 13, 14, 15, 16, 18, 13, 19
In-group2: 10, 15, 16, 17, 18, 11, 12, 13, 14, 19
If out-group string and in-group string represent out-password, in-password respectively.
Selecting in group1, out-password is: 1234; related in-password is: 11, 12, 13, 14
Selecting in group2, out-password is: 5678; related in-password is still: 11, 12, 13, 14
Out-password is dynamic; but in-password is static.

THE DIFFERENCE AND SIGNIFICANT IMPROVEMENTS OF THIS INVENTION

Figure 1:
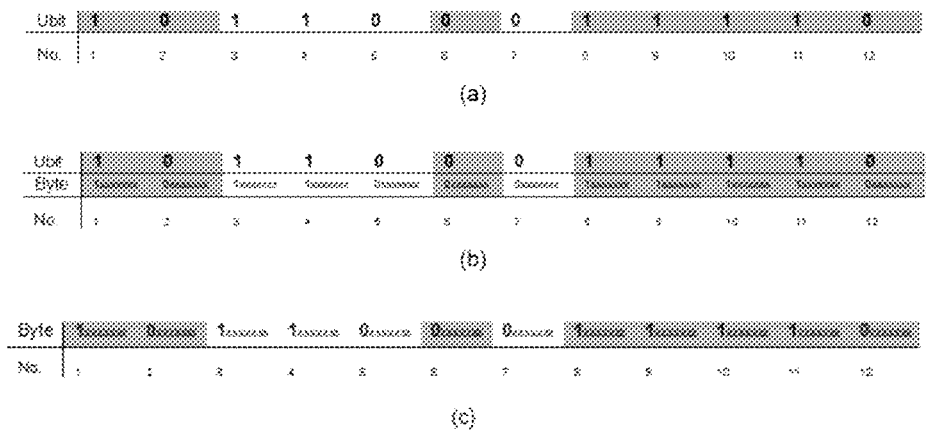
FIG. 1 Diagram of scanning a binary 1 and 0 sequence from left to right, distinguishing the sequence into group step by Right 0 rule; and diagram of scanning a binary 1 and 0 sequence from right to left, distinguishing the sequence into group step by Right 0 rule.
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.
Figure 2:
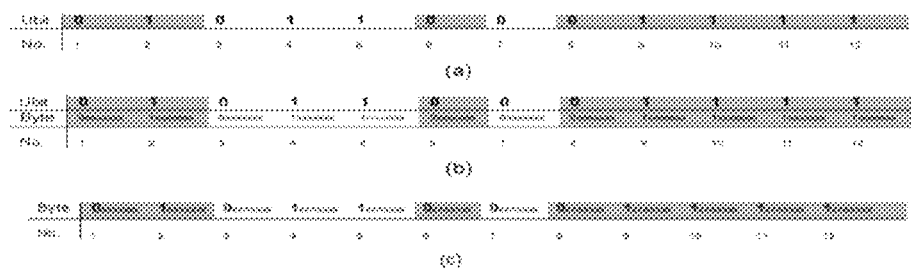
FIG. 2 Diagram of scanning a bit 1 and 0 sequence from right to left, distinguishing the sequence into group step by Left 0 rule; and diagram of scanning a binary 1 and 0 sequence from left to right, distinguishing the sequence into group step by Left 0 rule
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.
Figure 3:
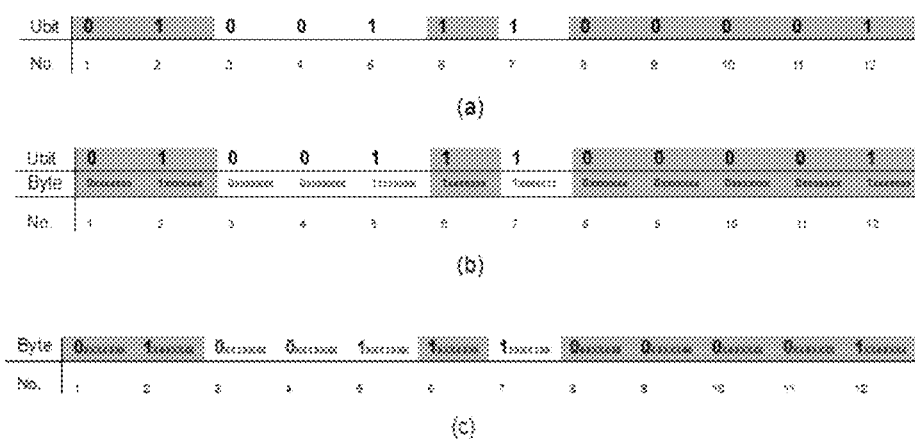
FIG. 3 Diagram of scanning a binary 1 and 0 sequence from left to right, distinguishing the sequence into group step by Right 1 rule; and diagram of scanning a binary 1 and 0 sequence from right to left, distinguishing the sequence into group step by Right 1 rule.
  (a) The 1 and 0 sequence is distinguished into groups;
  (b) The byte sequence is grouped into groups by Uframe sequence outside the sequence;
  (c) The byte sequence is grouped into groups by Uframe sequence inside the sequence;
  The groups are white and grey alternately shaded.
Figures 7, 8, 9, 10:
FIG. 7 Diagram of distinguishing Chinese character sequence into words by Uframes outside the character sequence
  Above: Uframe sequence outside the character sequence;
  Below: Chinese character sequence is distinguished into words by the Uframe sequence above.
FIG. 8 Diagram of object attribution embedded in Ucode and related to Ucode
  (a) An Ucode sequence, object attribution embedded in related Ucode
  An Ucode file contains 1, 2, 3, 4, and 6 byte Ucodes. The underline Ucodes are 3, 3, 3, 4, 2, 6 bytes and 1 byte, respectively.
  (b) An object sequence, in which object attribution embedded in related Ucode in (a);
  The object sequence is displayed in humans' language, a character sequence, which is grouped by Ucode sequence in (a), outside (b)
  The objects are represented by 1, 2, 3, 4, or 6 byte of Ucodes; each object in (b) is related to one Ucodes in (a) respectively, the underlined objects are audio, video, image, 2 character word; 1 character word, 3 character word and 1 letter respectively. Each Ucode is displayed as a group of symbols. The symbol pair "♪ ♪" with enclosed characters represents audio object, the symbol pair "🎞 🎞" with enclosed characters represents video object; and the symbol pair "🖼 🖼" with enclosed characters represents image object respectively. Variable-length and different kinds of objects are mixed in a code sequence, and mixed processed.
FIG. 9 Diagram of distinguishing a binary 1 and 0 sequence into segments by Ucodes inside the sequence
  A binary 1 and 0 sequence is divided into N segments (Seg) by N Ucodes (Uc), each Ucode contains the attribution of each segment, such as data type, the data length of each segment.
FIG. 10. Diagram of Ucode format for keyword, operator, or identifier;
  7th, 15th and 23rd are Ubit; 22nd bit is flag, 0 for identifier, 1 for keywords or operators; for variables, the 16 bits, with grey shading, are used coding the memory address of each variable; 18th-21st bits for variable type; if 22nd flag=1, 21st acted as flag, 0 for keywords, 1 for operators.
Figure 17:
FIG. 17. Diagram of object inserting
"致爱丽丝" ("Allis") has been inputted; and a three character Chinese word object: "会计师" is inserted.
Figure 18:
FIG. 18. Diagram of object searching
Searching video object "cat and mouse 10".
Figure 19:
FIG. 19. Diagram of clip "cat and mouse 10" searched
Clip "cat and mouse 10" has been searched, and playing.
Figures 20, 21, 22:
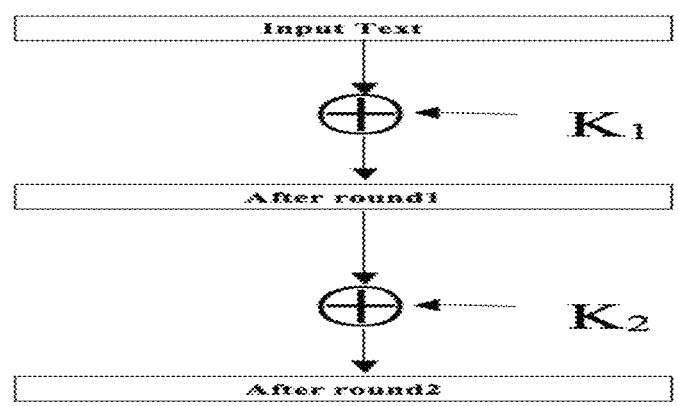
FIG. 20 Diagram of Transposing Uframe and the related segments
(a) Before transposing: one Uframe sequence (above row), a binary 1 and 0 segment sequence (below row), a number represents a segment; one Ubit relates to one segment.
The first and second Uframe are 10, 110 respectively; the related segments are 1, 2 and 3, 4, 5 respectively.
(b) After transposing: The first and second Uframe are 110, 10; and the related segments are 3, 4, 5 and 1, 2 respectively.
FIG. 21 Diagram of shifting Ucode key
(a) Before UG8 left shift
(b) After UG8 left shift
The length of different Ucode is different.
FIG. 22 Diagram of Block cipher using an Ucode key
Ucode key operates with a sequence, first XOR operate with K1, for example the key in FIG. 21 (a), then XOR operates with k2, for example, the key in FIG. 21 (b).

Claim 1-2 can make big significant improvements, take some examples:

Ubit makes data semantic, understandable to both humans and machine; no compiler needed to run a source program. Machine can perform algorithm discovery process rather than just obeyed execution, and embodies real intelligence. Computer scientists' dream can be realized.

For prior computer technology, machine only understand machine language, but doesn't understand human language, such as algorithm, program, web pages; which must be translated to machine for execution. Therefore, the machine can only possess artificial intelligence, but without any real intelligence.

But claim 1-2 can make machine understand human language and possess real intelligence.

Ubit can also make hardware and software cheaper, much more efficiency and space saved.

Refer to page 1, 5, 6 of this description; and also can refer to 1.

REFERENCES

1. Shengyuan Wu, Introduction to Ubit Semantic Computing, Proceedings of the 2014 International Conference on Semantic Web and Web Services of Computer Science (SWW'14), 07, 2014

The invention claimed is:
1. A binary 1 and 0 digital data processing method, the method comprises at least one of the following:
   a1) Embed information in Ucodes or associate information with Ucodes;
   a2) Extract the information embedded in or associated with Ucodes;
   wherein, the Ucode comprises at least one of the following characteristics:
   b1) Scan a binary 1 and 0 sequence from left to right, distinguishing the sequence into group step by Right 0 rule as the following:
   Scanning a binary 1 and 0 sequence from left to right, if the first bit is 1, continue scanning until a bit 0 is met, then from the first bit 1 to bit 0 is distinguished as a group; if the first bit is 0, then the bit 0 is distinguished as a group; continue scanning and distinguishing until the end of the sequence, if the last bit of the sequence is not 0, then the last group is an incomplete group;

The group above is characterized as: The left bit neighbor of a group is not 1, but the right bit neighbor of a group is 1 or 0, there is one bit 0 in one group, if there are more than 1 bit in a group, then the bit 0 is the rightmost bit in the group;

b2) Scan a binary 1 and 0 sequence from right to left, distinguishing the sequence into group step by Right 0 rule as the following:

Scanning a binary 1 and 0 sequence from right to left, if the first bit is 1, continue scanning until a bit 0 is met, then from the first 1 to the right neighbor bit of the bit 0 is distinguished as an incomplete group; if the first bit is 0, continue scanning until second bit 0 is met, then from the first 0 to the right neighbor bit of the second bit 0 is distinguished as a group; continue scanning and distinguishing until the end of the sequence;

The group above is characterized as:

The left bit neighbor of a group is not 1, but the right bit neighbor of a group is 1 or 0, there is one bit 0 in one group, if there are more than 1 bit in a group, then the bit 0 is the rightmost bit in the group.

\* \* \* \* \*